United States Patent [19]

Nikel et al.

[11] Patent Number: 5,768,529
[45] Date of Patent: Jun. 16, 1998

[54] SYSTEM AND METHOD FOR THE SYNCHRONOUS TRANSMISSION OF DATA IN A COMMUNICATION NETWORK UTILIZING A SOURCE CLOCK SIGNAL TO LATCH SERIAL DATA INTO FIRST REGISTERS AND A HANDSHAKE SIGNAL TO LATCH PARALLEL DATA INTO SECOND REGISTERS

[75] Inventors: Ronald E. Nikel, San Francisco; Daniel E. Lenoski, San Jose; Michael B. Galles, Los Altos, all of Calif.

[73] Assignee: Silicon Graphics, Inc., Mountain View, Calif.

[21] Appl. No.: 435,453

[22] Filed: May 5, 1995

[51] Int. Cl.$^6$ .......................... G06F 15/163; G06F 15/17
[52] U.S. Cl. .................. 395/200.62; 395/200.78; 395/200.8; 395/891; 375/355
[58] Field of Search ........................ 395/881, 550, 395/891, 849, 879, 555, 310, 200.62, 200.64, 200.67, 200.78, 200.8; 375/260, 359, 354, 355, 356, 357; 371/1, 47.1; 370/32

[56] References Cited

U.S. PATENT DOCUMENTS

| | | | |
|---|---|---|---|
| 4,881,165 | 11/1989 | Sager et al. | 395/550 |
| 4,888,684 | 12/1989 | Lilja et al. | 395/289 |
| 5,191,581 | 3/1993 | Woodbury et al. | 370/85.9 |
| 5,555,559 | 9/1996 | Tsubota | 395/879 |
| 5,572,721 | 11/1996 | Rostamian | 395/555 |

FOREIGN PATENT DOCUMENTS 0 375 794  7/1990  European Pat. Off. .

OTHER PUBLICATIONS

Gustavson, "The Scalable Coherent Interface and Related Standards Projects," *Advanced Multimicroprocessor Bus Architectures*, IEEE Computer Society Press, Los Alamitos, CA, 1992, pp. 195–207.

International Search Report for International Application No. PCT/US 96/06216, 26 Aug. 1996.

"Synchronous External Bus Architecture," *IBM Technical Disclosure Bulletin*, vol. 36, No. 1, IBM Corp., Armonk, NY, Jan., 1993, pp. 104–107.

*Primary Examiner*—Dinh C. Dung
*Attorney, Agent, or Firm*—Sterne, Kessler, Goldstein & Fox P.L.L.C.

[57] ABSTRACT

A system and method for transmitting data, using a source synchronous clocking scheme, over a communication (or data) link. A source synchronous driver (SSD) receives a micropacket of parallel data and serializes this data for transfer over the communication link. The serial data is transferred onto the communication link at a rate four times as fast as the parallel data is received by the SSD. A pair of source synchronous clocks are also transmitted across the communication link along with the serial data. The pair of clocks are the true complement of one another. A source synchronous receiver (SSR) receives the serial data and latches it into a first set of registers using the source synchronous clocks. The serial data is then latched into a second set of registers in parallel. The second set of registers are referred to as "ping-pong" registers. The ping-pong registers store the deserialized data. In parallel, a handshake signal, which is synchronized to the clock on the receiving end of the communication link indicates that there is a stream of n contiguous data words being received by the SSR. The ping pong registers guarantee that the deserialized data is available (valid) for two clock cycles. This provides a sufficient window to account for the synchronizer uncertainty on the handshake signal, while introducing minimum latency.

26 Claims, 14 Drawing Sheets

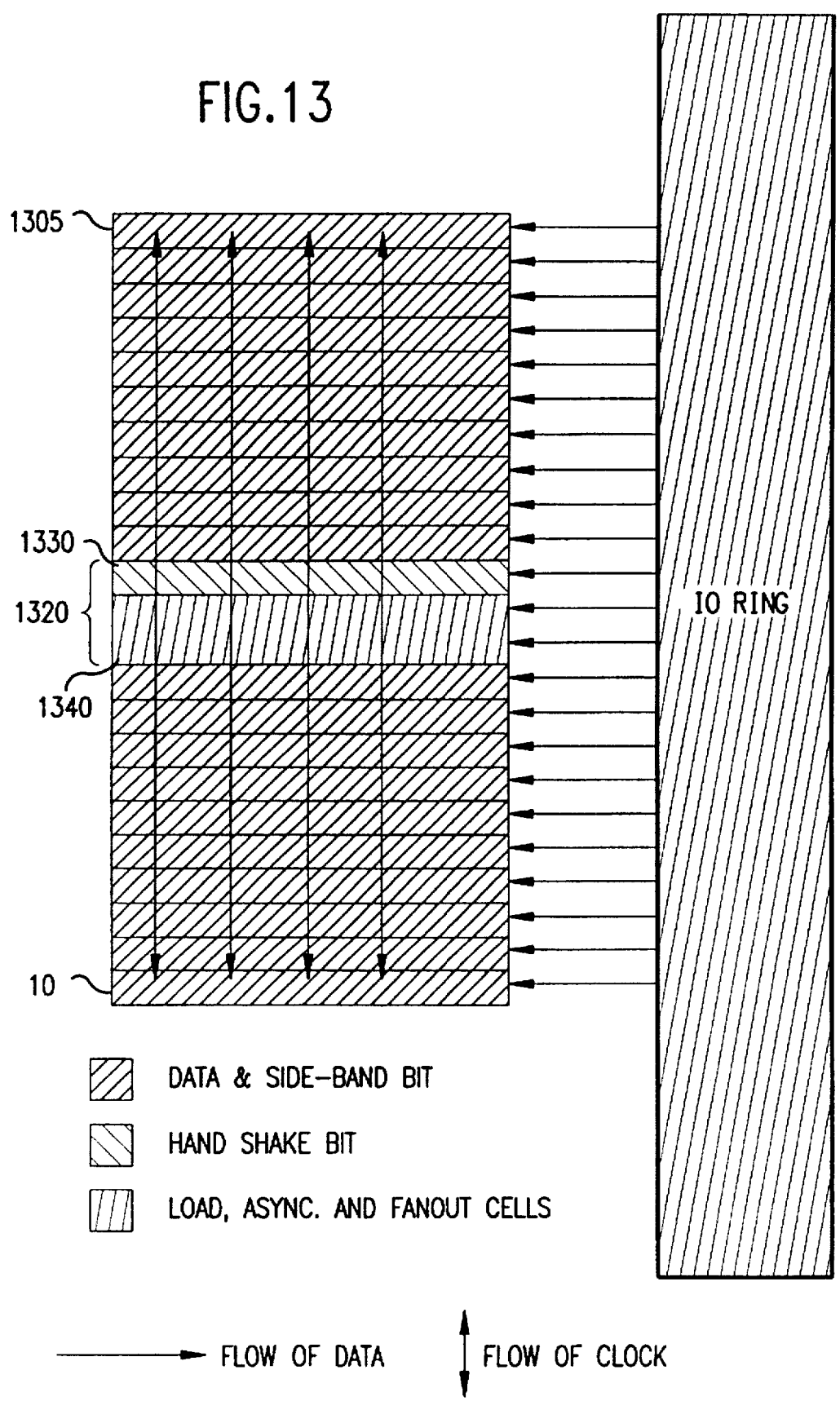

5,768,529

SYSTEM AND METHOD FOR THE SYNCHRONOUS TRANSMISSION OF DATA IN A COMMUNICATION NETWORK UTILIZING A SOURCE CLOCK SIGNAL TO LATCH SERIAL DATA INTO FIRST REGISTERS AND A HANDSHAKE SIGNAL TO LATCH PARALLEL DATA INTO SECOND REGISTERS

BACKGROUND OF THE INVENTION

1. Field of the Invention

The present invention relates to a communication link between a pair of processing nodes, and more particularly to the design, operating pursuant to a source synchronous clocking scheme, of a high-bandwidth data link that has low latency at opposite ends of the data link.

2. Related Art

A distributed computer system typically includes a plurality of physically distinct and separated processing nodes, each node having one or more processors and main memory that can be accessed by any of the processing nodes. Data is transferred within a processing node (intranode transfer) on the rising edge of the clock. Data is transferred between two or more different processing nodes (internode transfer) via a communication link (or channel). Data is transferred via a driver on the rising edge of a first clock cycle and received via a receiver on the rising edge of the next proceeding clock cycle. Unfortunately, each processing node uses a different clock. In order for the internode transfer of data to be successful, the driver must know the phase relationship of the clock on the receiving end of the communication link. That is, to transfer data between two processing nodes, the phase relationship (or skew) between the clock in the driving node and the receiving node must be as close as possible to zero degrees (also referred to as being "in phase"). However, maintaining a sufficiently small internode clock skew is a significant problem in larger systems that utilize very high clock rates. Management of this problem is also quite complex.

To overcome this problem, the concept of source synchronous clocking was developed. Computer systems that use source synchronous clocking transmit a clock along with data over the communication link. The clock is used to latch the data into a register at the receiving end of the communication link. One such system is the IEEE SCI standard. The IEEE SCI standard uses source synchronous clocking to send data over a communication link. However, the IEEE SCI standard requires that data be coded so that there are a balanced number of 0's and 1's in a serial bitstream. This coding adds extra bits into the bitstream which increases complexity and latency and consumes bandwidth.

Thus, what is needed is a system that utilizes source synchronous clocking which has low latency and does not require data to be coded.

SUMMARY OF THE INVENTION

The present invention relates to the design of high-bandwidth data interconnect that has low latency. The present invention is well suited to operate within an environment that includes a narrow bus width. Consequently, the present invention utilizes a high frequency data solution for transmitting data that limits the latency from one end of the link to the other end of the link. The present invention uses source synchronous clocking (SSC) and a unique clocking and buffering scheme to minimize latency and provide reliable transfer of data.

The source synchronous clocking logic is based on a source synchronous driver (SSD) and a source synchronous receiver (SSR). The SSD and SSR are connected via a communication link. For reasonable efficiency, the SSD and SSR are assumed to have clocks that are within some small frequency difference from each other (e.g., 100–200 PPM), but each can have an arbitrary phase relationship. The SSD serializes four (4) parallel bits of data into a sequential stream of four bits with a pair of associated clocks (i.e., source synchronized clocks). The serialized data, clocks and a handshake signal are transmitted across the communication link. In a preferred embodiment, the SSD is replicated twenty times. Thus, 80 parallel bits are input and 20 bits are transmitted in parallel each clock cycle along with a pair of clocks and a handshake signal.

The SSR latches the serialized data from the communication link into a set of registers. The serialized data from the set of registers is then latched into a pair of registers in parallel. The pair of registers (referred to herein has "ping-pong" registers) hold the deserialized data for two receiver clock cycles. In parallel, the handshake signal, which is synchronized to the SSR's local clock, indicates that there is a stream of n (n=2 in a preferred embodiment) contiguous data words being received by the SSR. The two ping-pong registers guarantee that each data word is valid for two receiver clock periods. This provides a sufficient window to account for the synchronizer uncertainty on the handshake signal while introducing minimum latency. By resynchronizing the data based on the handshake signal on a regular basis, the SSR is guaranteeing to adjust its sample window to the valid time of the data.

BRIEF DESCRIPTION OF THE DRAWINGS

The foregoing and other features and advantages of the invention will be apparent from the following, more particular description of a preferred embodiment of the invention, as illustrated in the accompanying drawings.

FIG. 13 is a floor plan of the SSR.

The preferred embodiment of the invention is now described with reference to the figures where like reference numbers indicate like elements. Also in the figures, the left most digits of each reference number corresponds to the figure in which the reference number is first used.

DETAILED DESCRIPTION OF THE INVENTION

The preferred embodiment of the invention is discussed in detail below. While specific configurations are discussed, it should be understood that this is done for illustration purposes only. A person skilled in the relevant art will recognize that other components and configurations may be used without parting from the spirit and scope of the invention.

Figure 1:
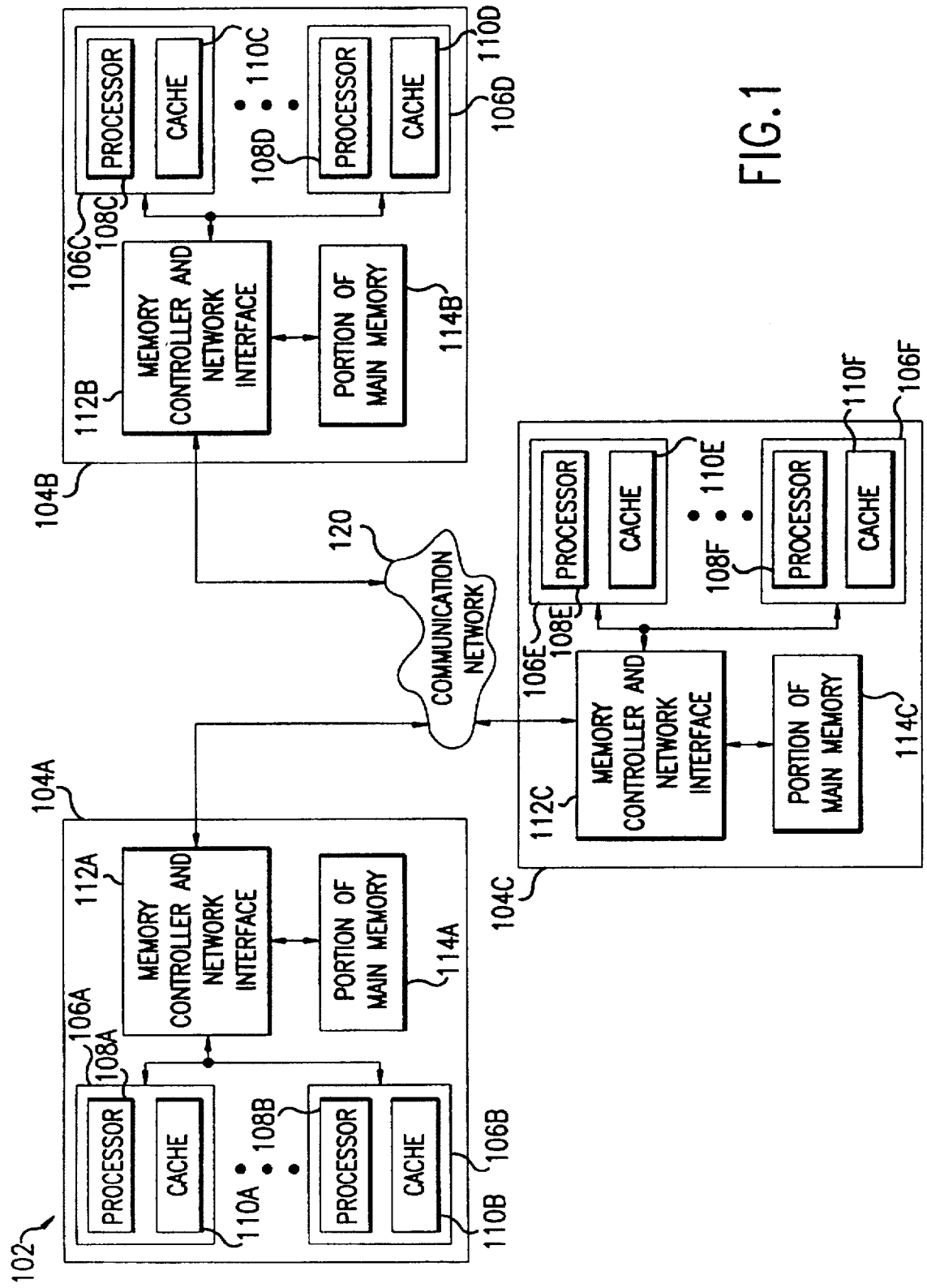
FIG. 1 is a block diagram of a distributed memory computer system 102.

FIG. 1 is a block diagram of a distributed memory computer system 102. The computer system 102 includes a plurality of processing nodes 104, which are physically distinct and physically separated from one another. The processing nodes 104 communicate with each other over a communication network 120, representing any well known data communication means, such as a bus, local area network, wide area network, etc., or any combination of these.

Each processing node 104 includes one or more computing nodes 106 (preferably, each processing node 104 includes two computing nodes 106, although each processing node 104 may alternatively include other numbers of computing nodes 106). Each computing node 106 includes a processor 108 and a cache 110. Each processing node 104 also includes a memory controller and network interface 112. The processors 108 in any particular processing node 104 communicate with other devices connected to the communication network 120 via the memory controller and network interface 112 contained in that processing node 104.

Each processing node 104 also includes a portion of main memory 114. The portions of main memory 114 in all of the processing nodes 104 collectively represent the main memory of the computer system 104. Any processor 108 in any processing node 104 can access data stored in the portion of main memory 114 contained in any other processing node 104. Access to data contained in the portion of main memory 114 of any particular processing node 104 is controlled by the memory controller and network interface 112 contained in that same processing node 104.

The present invention communicates over the communication network 120 via a source synchronous interconnect. A source synchronous interconnect includes a drive port, a uni-directional point-to-point interconnect and a receiver port. Thus, each processing node has a driver (not shown) and a receiver (not shown). Data is communicated by sending data, side band information, a handshake signal and a clock together along the communication network 120.

The clock sent with the data by the driver is skewed so that phase shifted by 90 degrees (centered) with respect to the data, side band information and handshake signal. In a preferred embodiment, this is achieved by adding extra delay into the media that carries that clock signal. In a preferred embodiment, extra trace is added in the printed circuit board (PCB).

The driver and receiver technology can be broken into two sections: (1) input and output cells and (2) driver and receiver logic. The input and output cells are connected to the system level interconnect. That is, the input and output cells act as an interface between the driver and receiver logic and the printed circuit board interconnect. Input and output cells are very well known in the art, and for the sake of brevity will not be described in detail herein. The driver and receiver logic are described in detail below.

Figure 2:
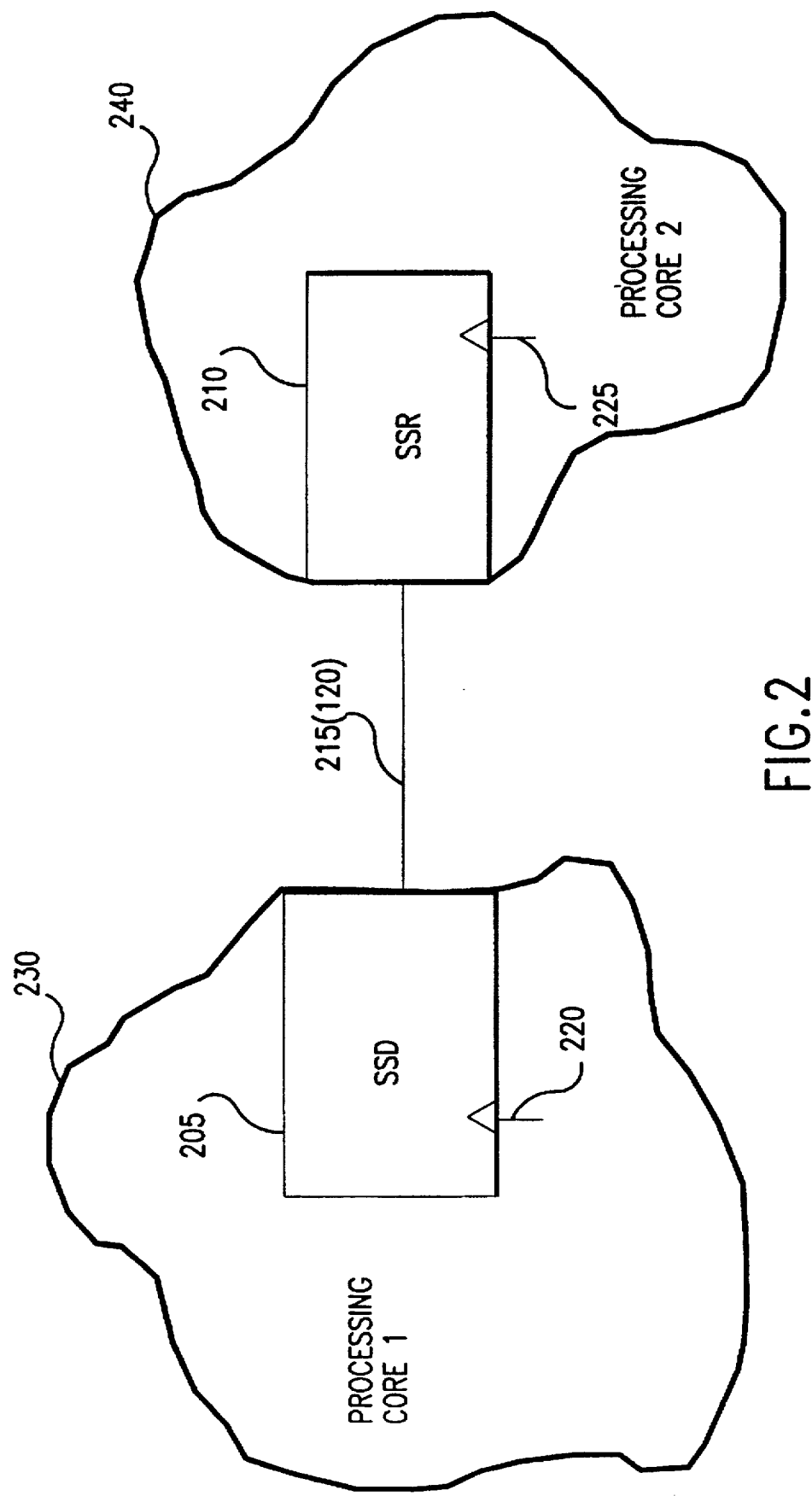
FIG. 2 is a simplified block diagram of the present invention illustrating a communication link between a Source Synchronous Driver (SSD) and a Source Synchronous Receiver (SSR).

FIG. 2 is a simplified schematic block diagram illustrating the general principles of a preferred embodiment of the present invention. Following an introduction to the general principles of the system, its major elements are more fully described in separate portions of the detailed description.

Referring to FIG. 2, a first processing node (or core) 230 houses a Source Synchronous Driver (SSD) 205 and a second processing node (or core) 240 houses a Source Synchronous Receiver (SSR) 210. The terms node or core should be interpreted broadly and includes any type of application specific logic. The first processing node 230 has an associated local clock 220 and the second processing node 240 has an associated local clock 225. Local clocks 220 and 225 are also referred to as core clocks. SSD 205 and SSR 210 are connected via a communication channel or link 215. Data is transferred across link 215 along with an accompanying clock. This is referred to generally as a source synchronous link. In a preferred embodiment, each processing node 230, 240 has an SSD 205 and SSR 210. Accordingly, each processing node 230, 240 can be both driving data to and receiving data from another processing node at the same time (i.e., the communication link 215 is full duplex).

In a preferred embodiment, data is transferred across line 215 in micro-packets. A micro-packet is eight (8) consecutive bits of data. The data transferred across link 215 is coded with a handshake signal and a clock. During the transmission of the first four (4) bits of data, the handshake signal is active and for the following four (4) bits the handshake signal is inactive. Micro-packets of data can be transmitted across link 215 without inserting dead cycles. The data and the clock are sent over line 215 simultaneously. Additionally, both the data and the clock are transmitted at the same frequency.

Figure 3:
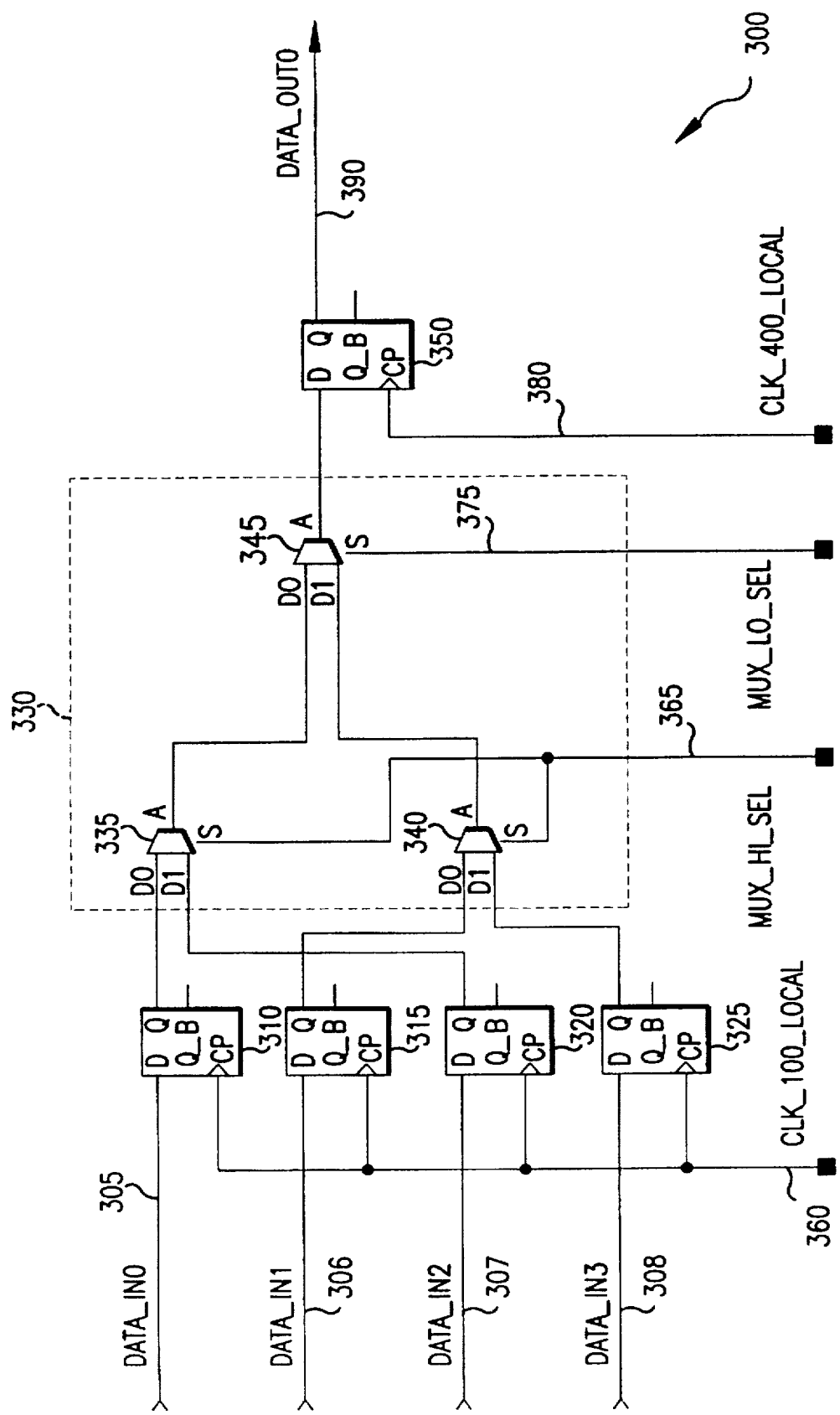
FIG. 3 is a schematic diagram of the SSD.

FIG. 3 is a detailed schematic diagram of a SSD for a single data slice (SSD 205). SSD 205 is responsible for the transfer of a ½ micro-packet of data (i.e., 4 bits of data). That is, SSD 205 handles, in a preferred embodiment, four bits of data at any given time. Each SSD 205 has four (4) input flip flops 310–325, a multiplexing circuit 330 and an output flip flop 350. In a preferred embodiment, SSD 205 is replicated twenty (20) times. The link 215 between SSD 205 and SSR 210 includes 20 data lines, a handshake (DATA_READY_L) signal and two clock signals. It should be noted, however, that the present invention is scalable to any system. For example, it is contemplated that in an alternate embodiment, the SSD 205 and SSR 210 will be replicated ten or forty times. One skilled in the art will readily appreciate the minor modifications that need to be made to implement these alternate embodiments.

The input to the SSD 205 includes: data and side-band information, a handshake signal (DATA_READY_L) and a full frequency clock. In a preferred embodiment, the clock has a maximum frequency of 400 MHz (CLK_400). The input clock is shown at reference number 380. The main purpose of the SSD 205 is to receive four parallel bits of data from a master (processing core) and to serially transmit this data to a receiver (slave). The serial transmission occurs, however, at four times the frequency that the four parallel bits are latched into the input flip-flops 310–325. In essence, the goal of the link is to use fewer wires (e.g., data lines), but to maintain the same bandwidth as if the data was being sent in parallel.

The clock is sent differentially. That is, there are two lines for the clock between the driver and receiver, each line having an inverse clock signal of the other. In effect, the two clock signals are used to latch data into the receiver on both edges of the clock cycle.

The data 305–308, side band information and handshake signal (shown in FIG. 4) are clocked into input flip flops 310–325 at ¼ the input clock frequency. The side band information contains encoding/decoding information and also some information about channels. In a preferred embodiment, data can be sent across a plurality of different virtual channels of which only one can be active at any point in time. The well known generation of the side band information is beyond the scope of this invention and for the sake of brevity will not be described in detail herein.

In a preferred embodiment, the input clock frequency is 400 MHz so the clock for the flip-flops 310–325 is 100 MHz. The 100 MHz clock (CLK__100__LOCAL) is shown at reference 360. The output from the input flip flops 310–325 is input into a 4:1 multiplexor (not shown). In a preferred embodiment, three 2:1 multiplexors 335–345 are used in place of the 4:1 multiplexor for timing purposes. Multiplexors 335 and 340 are clocked at ½ the input clock frequency (signal name MUX__HI__SEL) (i.e., 200 MHz). Multiplexor 345 is clocked at ¼ the input clock frequency (signal name MUX__LO__SEL) (i.e., 100 MHz).

The multiplexors 335–345 serve to serialize the four parallel input data bits into four serial bits. The output from multiplexor 345 is input into output flip flop 350. In a preferred embodiment, flip flop 350 is a D flip flop. Flip flop 350 is clocked at the input clock frequency (CLK__400). At each clock cycle, a single bit of data is placed on link 215. All four input bits are placed onto the link 215, one at each rising edge of input clock 380 (CLK__400__LOCAL). The output data is represented by reference number 390.

Figure 4:
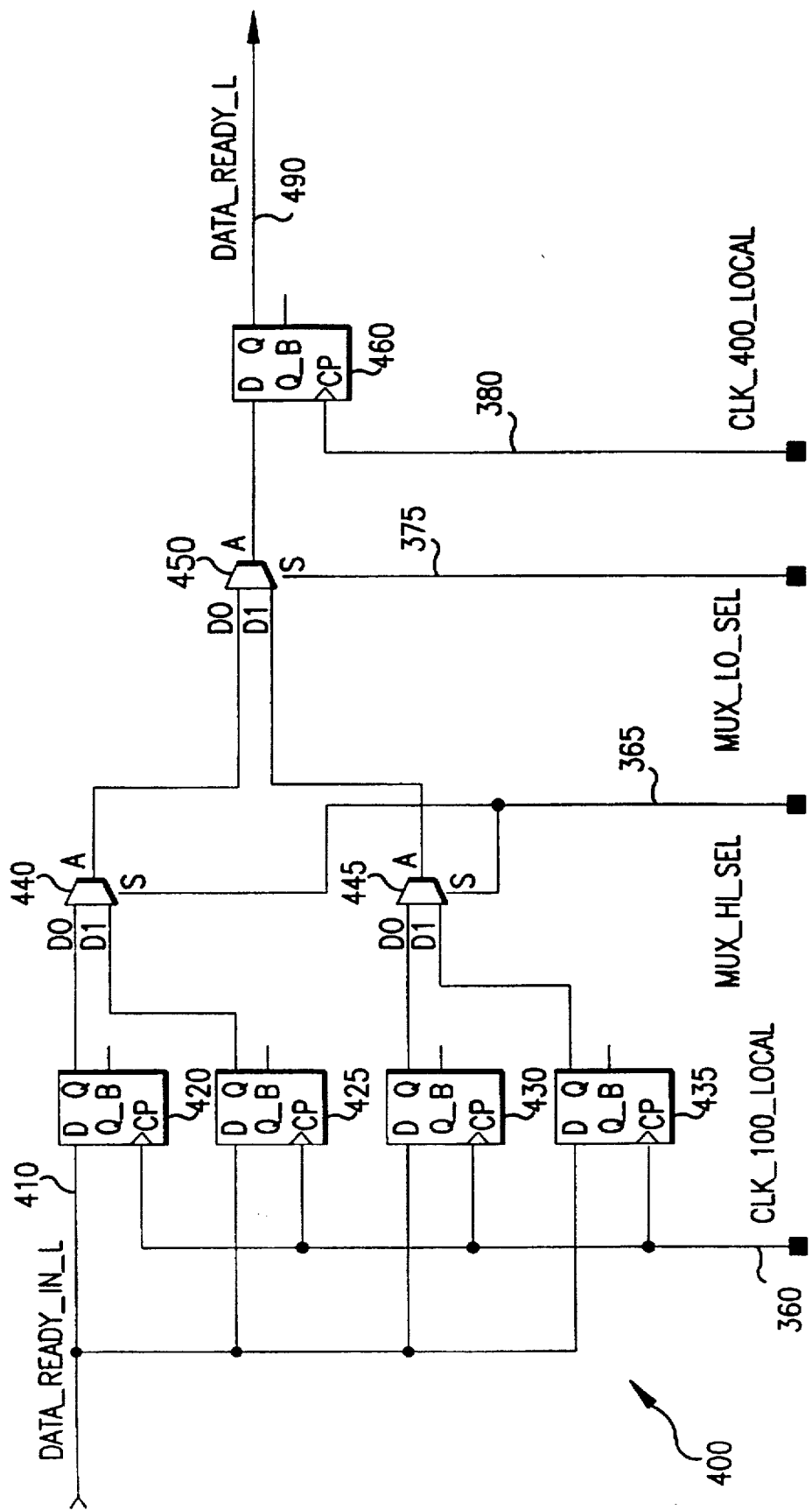
FIG. 4 illustrates a circuit for transmitting a handshake signal over the communication channel.

FIG. 4 illustrates a circuit 400 for transmitting handshake signal 490 (DATA__READY__L). Handshake signal 490 signals SSR 210 that a micropacket is being transferred across the communication link 215. Circuit 400 includes four input flip-flops 420–435, three multiplexors 440–450 and an output flip-flop 460. Circuit 400 is identical to circuit 300 with the one exception that DATA__READY__IN__L 410 is used as an input to all four input flip-flops 420–425 (as opposed to data). Additionally, circuit 400 is only replicated once, as opposed to circuit 300 which is replicated 20 times in a preferred embodiment.

Circuit 400 produces a handshake output signal 490 (DATA__READY__L). For the first half of the micro-packet (i.e., first 4 bits), handshake output signal 490 is asserted low. For the second half of the micro-packet, handshake output signal 490 is asserted high. (See FIG. 6 for a detailed timing diagram of handshake signal 510.) Circuit 400 guarantees that handshake output signal 490 is transferred along with output data 390.

Figure 5:
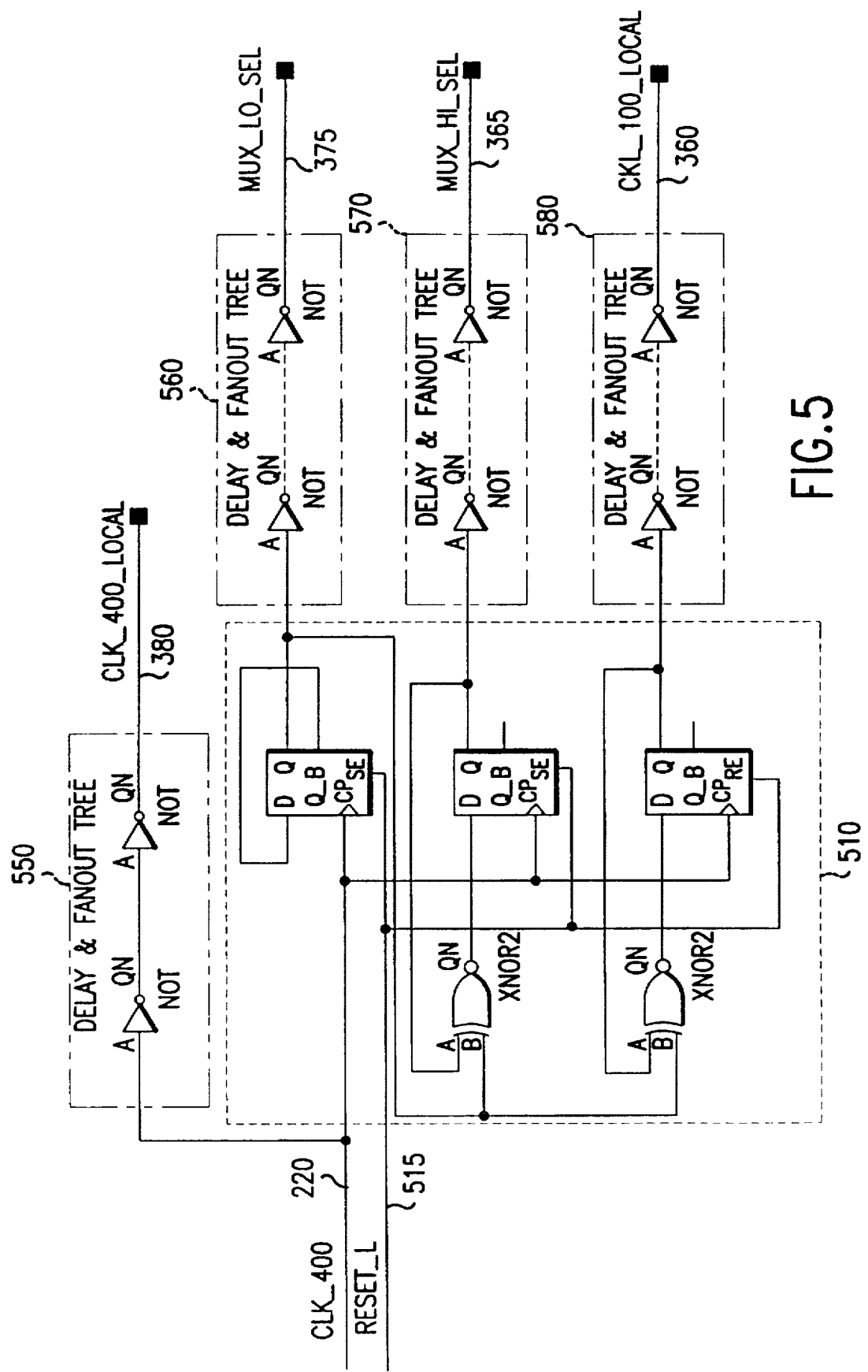
FIG. 5 illustrates a circuit for generating the necessary clock and control signals for controlling the SSD.

FIG. 5 illustrates a circuit 500 for generating the ¼ speed clock (CLK__100__LOCAL) 360, the MUX__HI__SEL 365, MUX__LO__SEL 375 and CLK__400__LOCAL 380. These clock signals are generated using a 2 bit counter 510. Counter 510 goes to a known state after reset 515 has been asserted. Counter 510 sets CLK__100__LOCAL 360 to a low state, and both MUX__HI__SEL 365 and MUX__LO__SEL 375 to a high state. The first clock after RESET__L has been de-asserted, CLK__400 (also referred to as local clock 220) increments counter 510 by one binary bit. In our case the multiplexor control signals 365, 375 return to 00. The next clock increments counter 510 by one binary bit to 01, then 10 and finally to 11. Counter continues this process ad infinitum. The CLK__100__LOCAL 360 is simply an inverse of the MUX__HI__SEL 365.

The signals generated by counter 510 along with the input clock (CLK__400) go through fanout and delay lines 550–565 to drive all the loads inside of SSD 205. To guarantee that SSD 205 operates correctly across all process, voltage and temperature variations, the fanout and delay lines 550–565 for the input clock, CLK__100__LOCAL 360 and multiplexor selectors, MUX__HI__SEL 365 and MUX__LO__SEL 375, must have balanced delay. In a preferred embodiment, the maximum skew between the signals should be no more 400 ps. However, other skews are contemplated as would be apparent to one skilled in the art. The general rule to be followed is that the full speed clock 380 (CLK__400__LOCAL) will never lag the CLK__100__LOCAL 360. However, other phase relationships are contemplated, as would be apparent to one skilled in the art.

Figure 8:
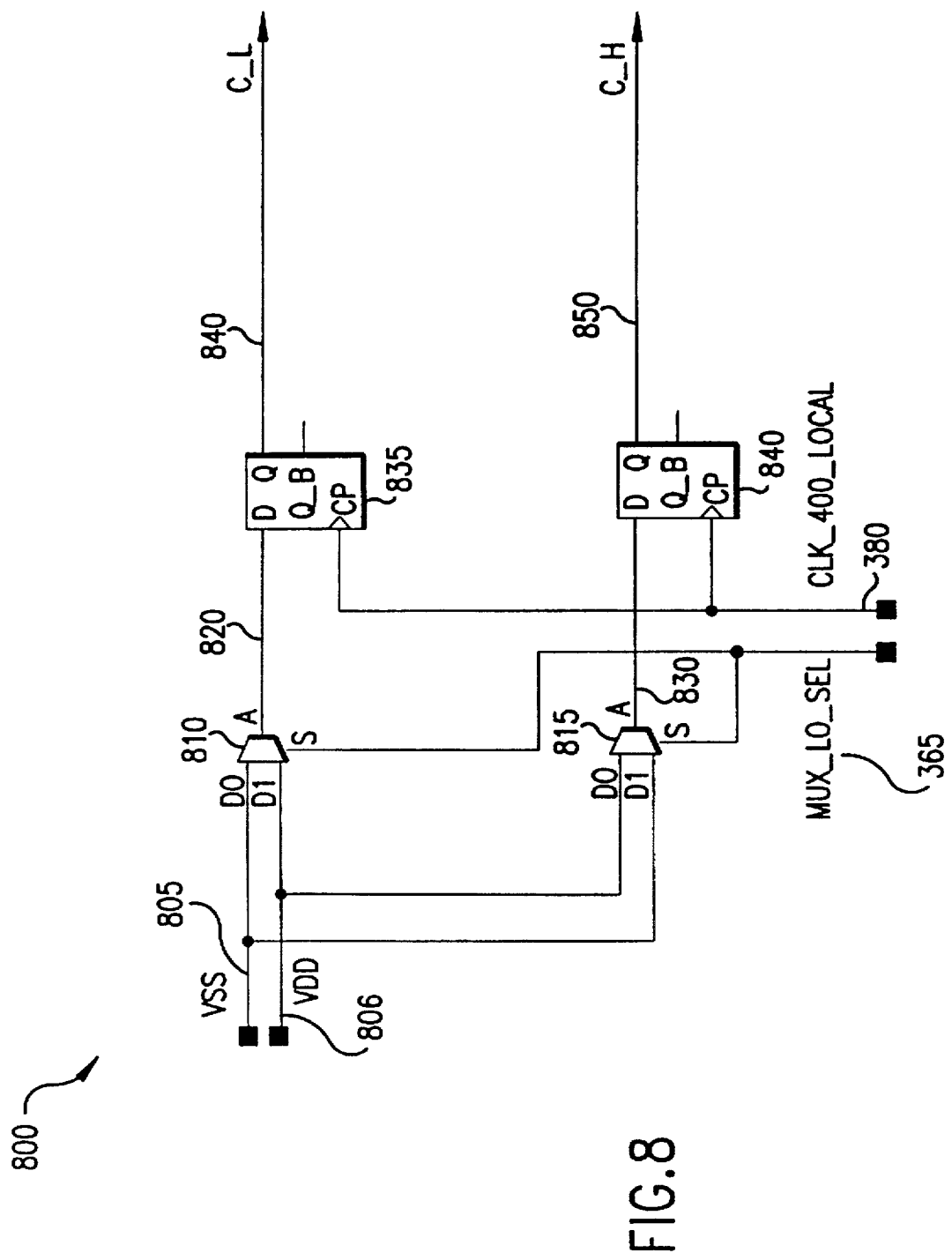
FIG. 8 illustrates a circuit for the generation of the two clock signals that are transferred along with the data across the communication channel.

FIG. 8 is a circuit 800 for the generation of the two clock signals, C__L signal 840 and C__H signal 850, that are transferred along with the data across communication channel 215. C__L signal 840 is the inverse of C__H signal 850. Circuit 800 includes a pair of multiplexors 810 and 815 and a pair of flip-flops 835 and 840. The inputs of both multiplexors 810 and 820 are tied to a high signal 805 and a low signal 806. The MUX__LO__SEL 365 is used to select an output 815 and 820 from the multiplexors 810 and 820, respectively. The outputs 815 and 820 are latched into the corresponding flip flop 835 and 840 using CLK__400__LOCAL 380. In a preferred embodiment, C__L signal 840 and C__H signal 850 are 200 MHz signals. C__H signal 840 and C__L signal 850, although the inverse of one another, are source synchronous clock signals that are used to latch data into SSR 210. When sending data from SSD 205 to SSR 210 a signal may encounter degradation and may arrive at SSR 210 slightly early or slightly late. Accordingly, these two clocks are skewed so that they are phase shifted by ninety degrees (centered) with respect to the data. This guarantees that each data bit is stable at SSR 210 before its corresponding clock arrives, thus assuring that the data can be properly latched into SSR 210.

Figure 6:
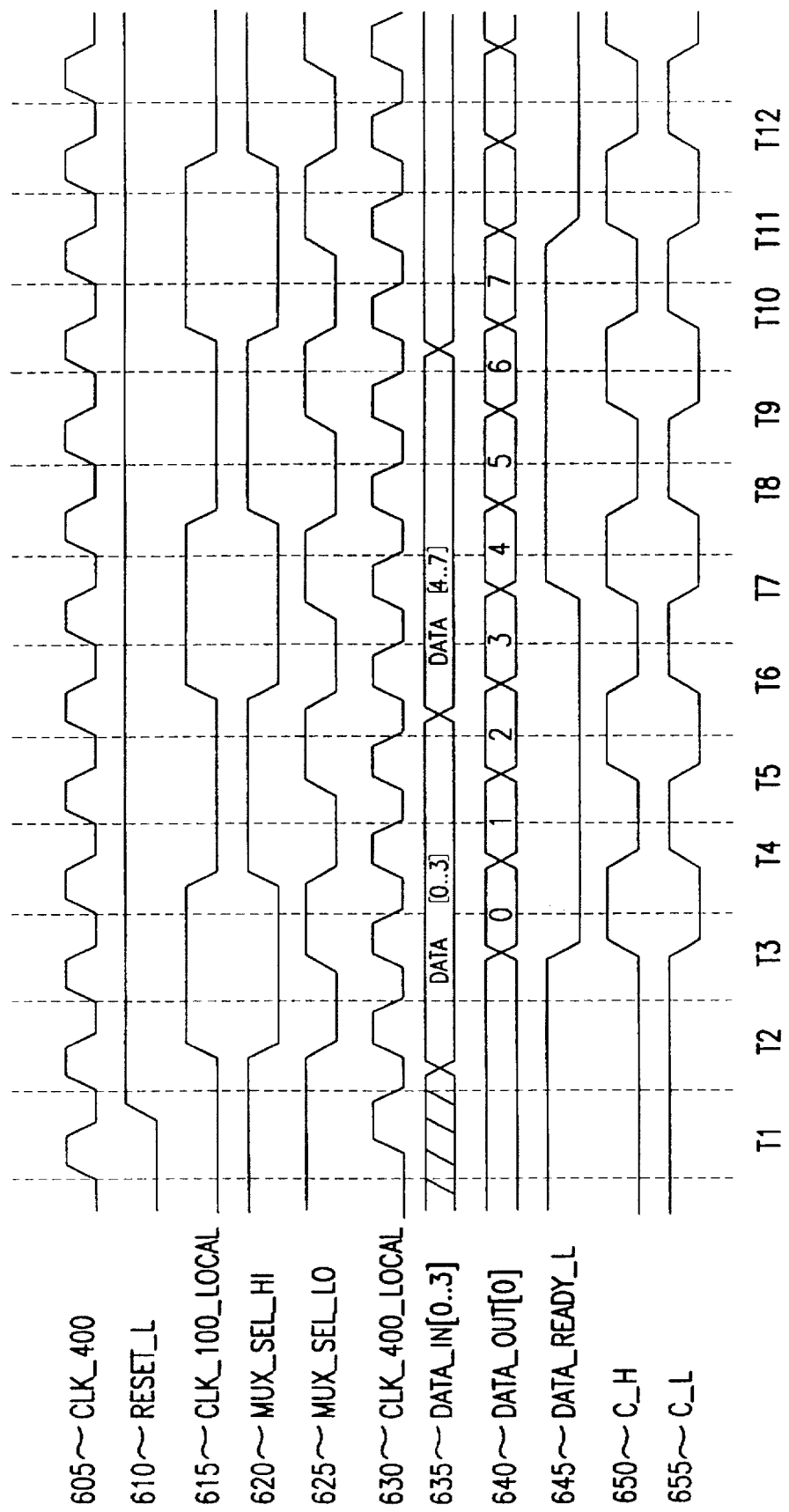
FIG. 6 is a timing diagram of the operation of the SSD.

FIG. 6 is a timing diagram illustrating the operation of SSD 205. Each clock cycle is shown via a set of vertical dashed lines. The full speed system clock (CLK__400) 220 is shown at reference number 605. As described above with reference to FIG. 5, CLK__400 220 is used for generating the other clocks and control signals. RESET__L 410 is an active low reset signal. Thus, during clock cycle T1 the RESET__L signal is deactivated. As shown at reference number 615, the CLK__100__LOCAL 316 is one fourth (¼) the clock rate of CLK__400 380. MUX__SEL__HI 365 is the inverse of CLK__100__LOCAL 360, as shown at reference number 620. As discussed above, MUX__SEL__HI 360 controls multiplexors 335, 340, 440 and 445. MUX__SEL__LO 375, which controls multiplexors 345 and 450, is one half (½) the clock rate of CLK__400 380; it could also be considered twice as fast as MUX__SEL__HI 365. This is shown at reference number 625. CLK__400__LOCAL 430 controls the transfer of data from output flip flop 350 onto communication channel 215.

At the rising edge of CLK__400 during clock cycle T2, the first four bits of data are available on the DATA__IN lines 305–308. During clock cycle T6, the second set of four bits are valid and available on the DATA__IN lines 305–308. The data on DATA__IN lines 305–308 is latched into flip-flops 310–325 on the next rising edge of CLK__100__LOCAL 360 (i.e., during cycle T2). The clocks are timed to output the data latched into flip-flops 310–325 onto the communication channel 215 on the next rising edge of CLK__400__LOCAL 380.

Handshake signal (DATA__READY__L) 490 (shown at reference number 645) is generated by SSD 205 and is an indication that the data is valid. For example, during T3–T7 the first four bits of the micropacket are valid and during T7–T11 the second four bits of the micropacket are valid. As discussed above, C_L signal 455 is the inverse of the C_H signal 450. C_H 450 and C_L 455 are transferred across the communication channel 215 along with the data from the output flip flop 350, and control the latching of the data at the receiving end of the communication channel 215.

Figure 7:
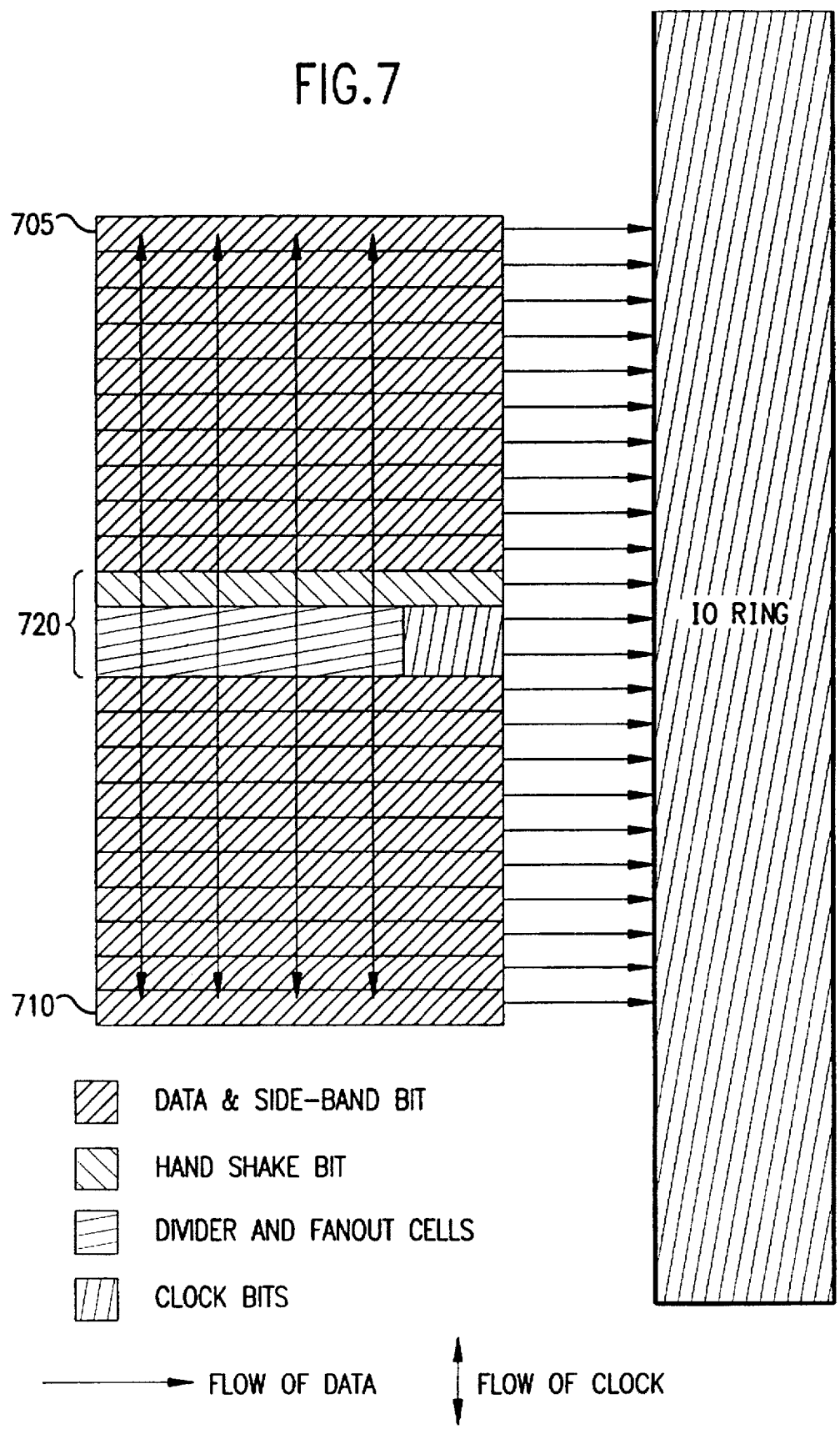
FIG. 7 is a floor plan of the SSD.

FIG. 7 is a diagram illustrating the floor plan for all twenty slices of SSD 205. The layout of SSD 205 should be done such that each SSD data slice (or cell) is laid out starting from the two outer most points of the chip. Two such SSD data slices are labeled as reference numbers 705 and 710. As discussed above, there are a total of twenty SSD data slices. In the center of the floor plan, an area 720 is created to lay out the handshake (DATA_READY_I) signal and clocks. These signals are placed in the center of the chip in order to minimize the skew between each of these signals. The clocks are layed out where the fanout and clock divider circuitry resides. The clocks and multiplexor select signals should run orthogonal to the data, sideband, handshake, and clock signals to minimize the cross-talk due to capacitive coupling.

Figure 9:
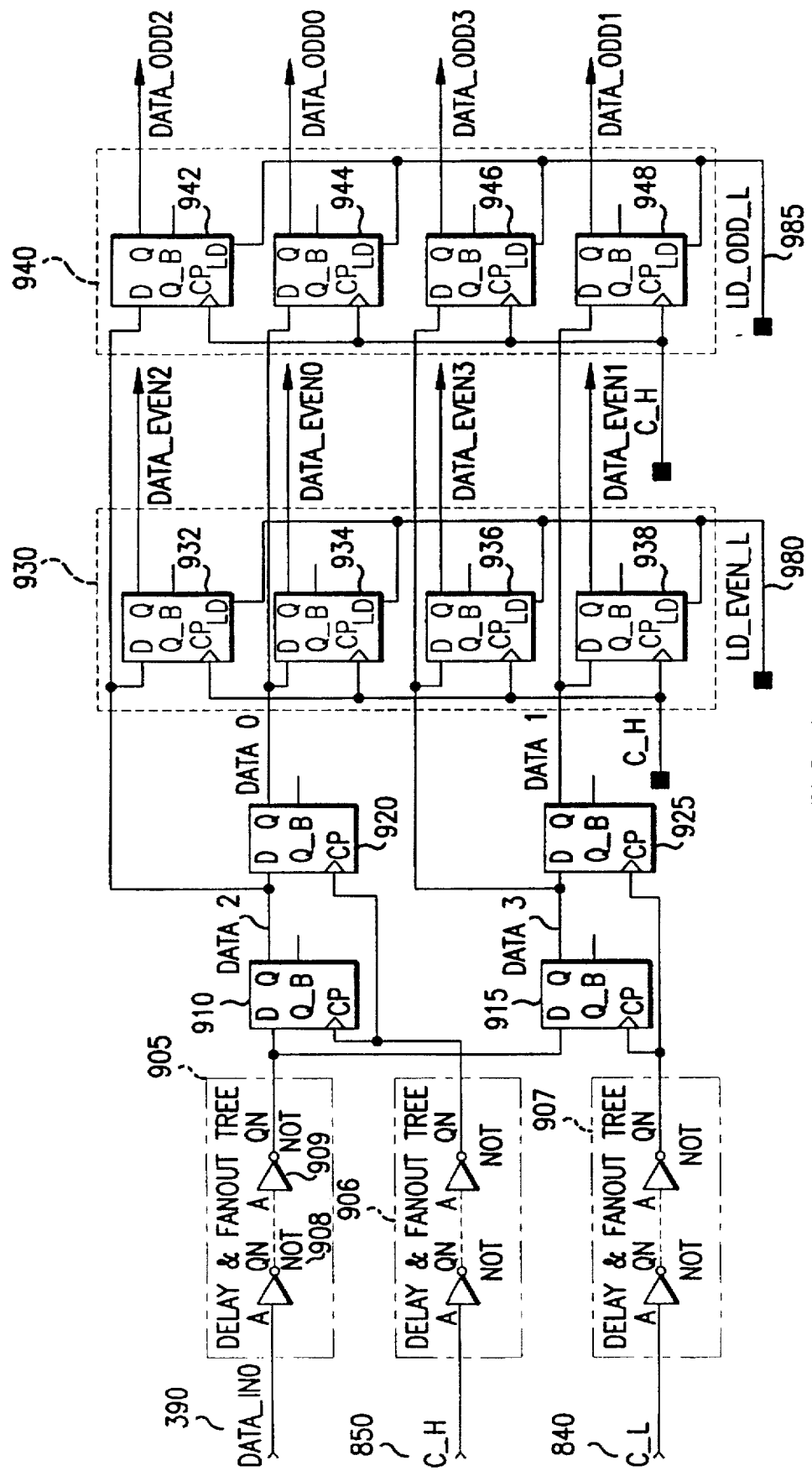
FIG. 9 is a schematic diagram of the SSR.

FIG. 9 shows a schematic diagram of an SSR 210 data slice (SSR 210). Similar to SSD 205, SSR 210 is replicated twenty times. SSR 210 includes a plurality of delay and fanout trees 905–907, four (4) input registers 910–925 and two "ping-pong" registers 930 and 940. The "ping-pong" registers 930 and 940 are labeled as "even" register 930 and "odd" register 940. SSR 210 outputs data and side band bits at ½ the input clock frequency along with handshake signal 490 (not shown in FIG. 9). The data and side band signals are latched into processing core 240 using the handshake signal 490 which is synchronized to local core clock 225 when it passes through a synchronizer circuit (shown in FIG. 10 as reference number 1075). The inputs to SSR 210 are the data and sideband information, handshake signal 490 and the two differential clocks (C_L signal 840 and C_H signal 850) all of which were placed on communication channel 215 by SSD 205.

The incoming clock frequency is two times the data output frequency of SSR 210. That is, SSR 210 drives data out every 10 ns or at a 100 MHz frequency. The data and clock input to SSR 210 is 200 MHz, but due to the fact that both edges of the clock are used to latch data, there is a virtual 400 MHz clock in SSR 210.

The clock inputs 240 and 250 to SSR 215 are rebuffered and fanned out within SSR 210 to drive the final number of loads. The data, sideband and handshake signals are also delayed and fanned out to drive their final loads. The delay and fanout of these signals are performed by circuits 905–907. Each delay and fanout tree includes a pair of NOT gates 908 and 909. The operation of the delay and fanout tree is well known in the art, and for the sake of brevity will not be described in detail herein.

Figure 10:
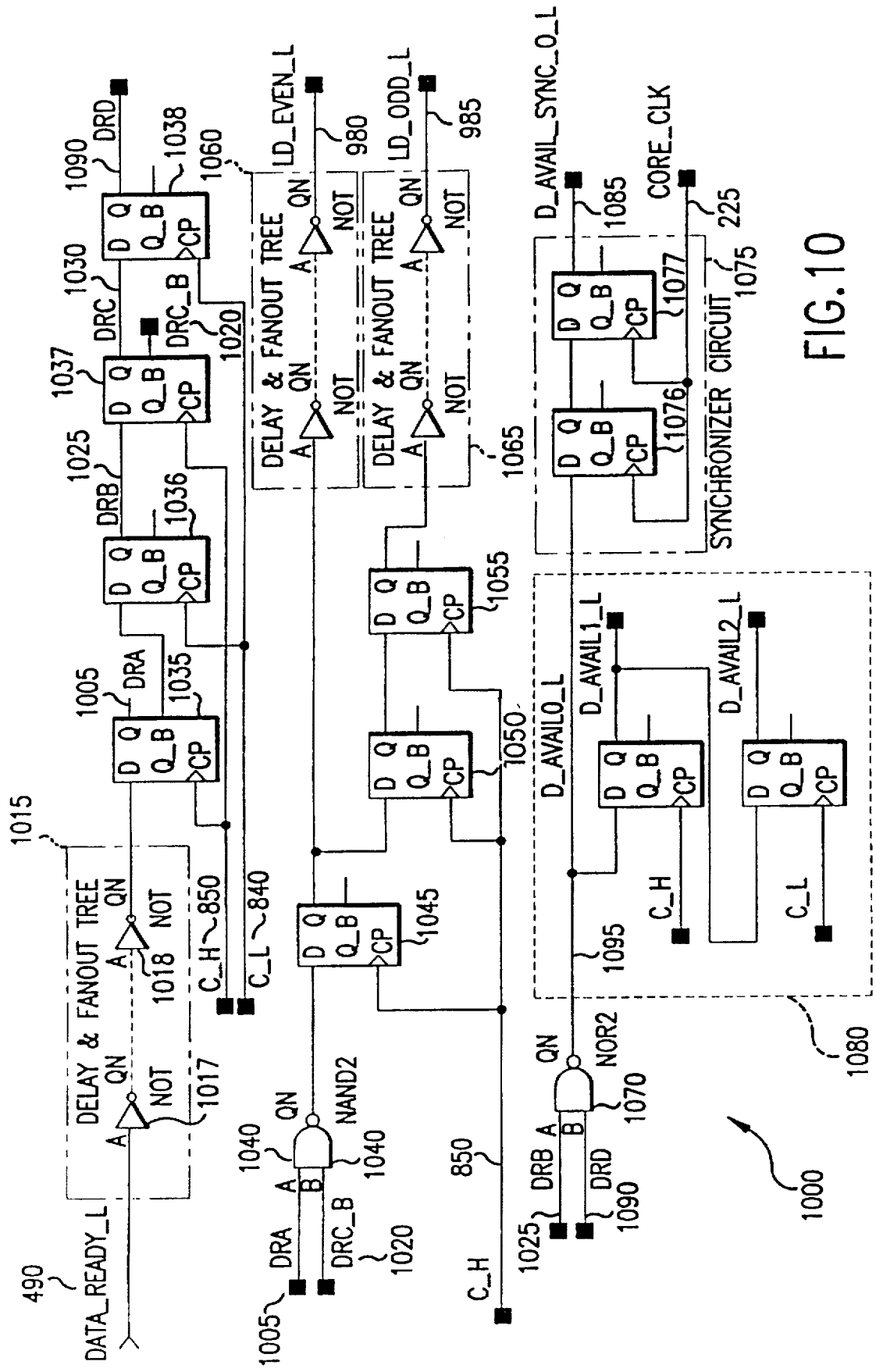
FIG. 10 illustrates a circuit for generating control signals based on a DATA_READY_IN_L signal.
Figure 11:
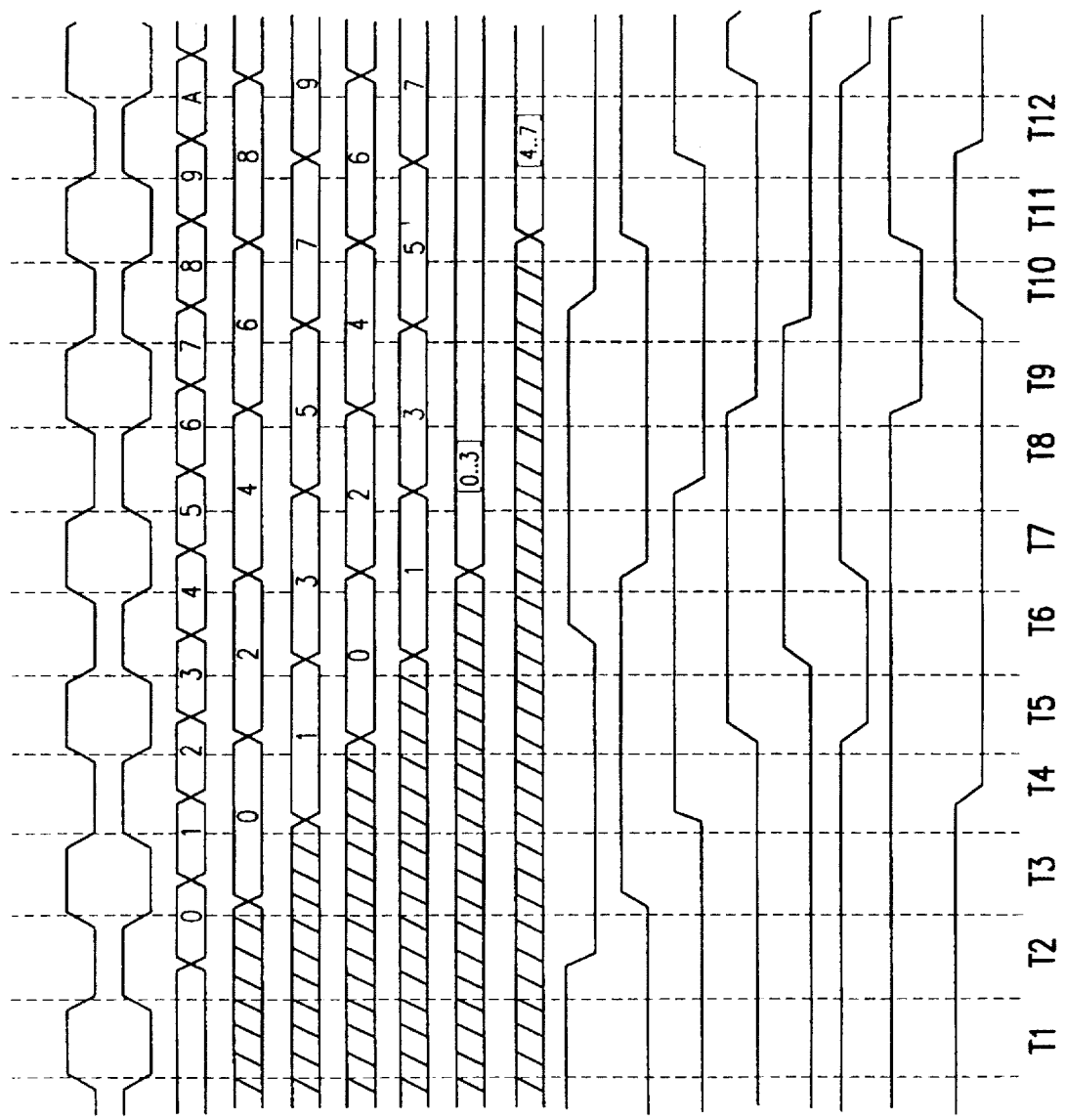
FIG. 11 isyfiing diagram of the operation of the SSR.

FIG. 10 illustrates a circuit 1000 for generating control signals based on DATA_READY_L 490. Circuit 1000 generates LD_EVEN_L 980, LD_ODD_L 985, D_AVAIL0_L 1095, as well signals representative of DATA_READY_L 490 but with added delay. The main purpose of circuit 1000 is to guarantee that data entering different portions of SSR 210 are latched in at the appropriate times. Each signal shown in Circuit 1000 is also shown in the timing diagram illustrated in FIG. 11 (which is described in below).

DATA_READY_L 490 (also referred above as handshake signal 490) is input to a delay and fanout tree (circuit) 1015. Delay and fanout tree 1015 includes a pair of NOT gates 1017 and 1018. Delay and fanout tree 1015 is used to guarantee that the phase relationship between the DATA_READY_L signal 490 and the source synchronous clocks (i.e., C_L signal 840 and C_H signal 850) is maintained. The output of the delay and fanout tree 1015 is input to a set of flip-flops 1036–1038. Each flip-flip 1036–1038 adds additional delay to DATA_READY_L signal 490. Flip-flops 1035 and 1037 are clocked using C_H signal 850 and flip-flops 1036 and 1038 are clocked using C_L signal 840. Flip-flop 1035 produces output DRA 1005, flip-flop 1036 produces output DRB 1025, flip-flop 1037 produces outputs DRC 1030 and DRC_B 1020 and flip-flop 1038 produces output DRD 1090. These signals are used as described below.

DRA 1005 and DRC_B 1020 (which is the inverse of DRC 1030) are input to NAND gate 1040. The output of NAND gate 1040 is input to flip flop 1045. Flip-flop 1045 is clocked using C_H signal 850. The output of flip flop 1045 is input to a delay and fanout tree 1060 which in turn outputs LD_EVEN_L 980. The LD_ODD_985 is produced by taking the output of flip-flop 1045 and passing it through a pair of flip-flops 1050, 1055 and a delay and fanout tree 1065. The pair of flip-flops 1050, 1055 are also clocked using the C_H signal 850. LD_ODD_L 985 is a phase shifted version of LD_EVEN_L 980. Each flip-flop 1045–1055 add an additional clock cycle to the delay of the signal. As discussed above, LD_EVEN_L 980 and LD_ODD_L 985 control the latching of data into even register 930 and odd register 940. LD_ODD_L 985 is timed so that it is asserted 10 ns after LD_EVEN_L 985.

DRB 1025 and DRD 1090 are input into a NOR gate 1070. The output of NOR gate 1070 is D_AVAIL0_L signal 1095. D_AVAIL0_L 1095 is asserted once DRB 1025 is asserted and is deasserted once DRD 1090 is deasserted. D_AVAIL0_L 1095, once synchronized to core clock 225 (also known as D_AVAIL_SYNC_0), is used to signal the processor core 240 that data is available in even register 930. Then on the following cycle of core clock 225 data is available in odd register 940. Note that additional flip-flops 1080 can be connected to D_AVAIL0_L 1095 to provide additional delay (i.e. phase shift the synchronized DATA_AVAIL0_L signal to the contents of even register 930 and odd register 940). This delay can be used to adjust the minimum and maximum sample points for the output of SSR 210. One skilled in the art should readily appreciate the modifications that can be made to the above circuits to alter the delay associated with the various signals in order to make the circuit compatible with a specific application.

All functions within SSR 210 operate according to the source synchronous clocks (C_L signal 840 and C_H signal 850). However, the source synchronous clocks are typically out-of-phase with respect to local core clock 225 of processing core 240. Accordingly, a synchronizer 1075 is provided to synchronize D_AVAIL0_L signal 1095 to core clock 225. Synchronizer 1075 includes a pair of flip-flops 1077, 1077 that are clocked using core clock 225. The synchronized signal is D_AVAIL_SYNC_0_L 1085. One skilled in the art will appreciate the variety of other circuits that can be used to synchronize D_AVAIL0_L signal 1095.

SSR 210 has a feature which guarantees that data can cross the asynchronous boundary from SSR 210 to the domain of core clock 225. This is achieved using handshake signal 490. SSR 210 pulse stretches the asserted handshake signal 490 to 1.5 times its normal width. By stretching the pulse to a width that is larger than the period of core clock 225 it is guaranteed that the stretched handshake signal will be latched into synchronizer 1075. If the pulse was the same width as the period of core clock 225, then there is a finite chance that handshake signal 490 would be lost all together.

Including an error detection check code such as cyclic-redundancy-check (CRC) is a well known technique to insure that errors on a communication link are detected. If such a check code is combined with well known retry mechanisms, such as sliding window protocol (reference W. Stallings, "Data and Computer Communications," 2nd-edition, Macmillan Publishing Company, 1988, pp. 137–141), then the link can recover from transient errors on the data lines. In order to recover from transient errors in the source synchronous clocks 840, 850 or handshake signal 490, it is critical that SSR 210 be able to clear itself automatically. The pipeline structure (i.e., no feedback) of the logic associated with D_AVAIL0_L 1095 insures that if the clock recovers from the transient error while the D_AVAIL0_L 1095 is held inactive, then SSR 210 will clear. Since the sliding window protocol idles the line before retrying an unacknowledged packet of data (one that is rejected because of an error), such an idle time is guaranteed. In contrast, if SSR 210 used a normal finite-state-machine to control even register 930 and odd register 940, it is possible that SSR 210 may not recover from a transient error.

The potential for retry also implies that the source interface has the capability to indicate that the line is busy (i.e., executing a retry). This same mechanism is used to insure that every N clocks, the data lines are idled. This is used to prevent data over-run due to frequency mismatch between the local clocks of SSD 205 and SSR 210 (specifically if the transmitted source synchronous clock is faster than local clock 225 of SSR 210). N is chosen so that the effective transmitter data rate is lower than the receiver's maximum receiver rate given clock tolerances.

As discussed above, the ping pong registers 930, 940 guarantee that the stored deserialized data is valid for two clock cycles. This provides a sufficient window to account for the synchronizer uncertainty on handshake signal 490, while introducing minimum latency. The handshake signal 490 is resynchronized relative to the data on a regular basis. This guarantees that the data is available from the ping pong registers 930, 940 during the two cycle window.

FIG. 11A illustrates a timing diagram for SSR 210 (including circuit 1000). The operation of SSR 210 will be described with reference to the timing diagram. C_H signal 850 and C_L signal 840 are shown at reference numbers 1110 and 1115, respectively. The data and side-band signals 390 are received by input registers 910–925 serially. That is, SSR 210 accepts one bit per clock cycle. This is shown at reference number 1120. Registers 910 and 920 are clocked using clock C_H signal 850 and registers 915 and 925 are clocked using clock C_L signal 840. In this way, the data is essentially being clocked into one register or the other on both edges of the clock.

Once the data becomes available, it is latched into registers 910 and 915 during each subsequent clock cycle. In particular, the first bit of data is latched into register 910 during clock cycle T3. The second bit of data is latched into register 915 during clock cycle T4 Next, the first bit of data is shifted into register 920 and the third bit of data is latched into register 910, as shown in clock cycle T5. Then, the second bit of data is shifted into register 925 and the fourth bit of data is latched into register 915, as shown in clock cycle T6. At this point the first half of the micropacket has been latched into SSR 210.

The output from these two pairs of registers 910, 920 and 915, 925 are then shifted into either even register 930 and odd register 940 in parallel during the next clock cycle (clock cycle T7). Even register 930 and odd register 940 include four flip flops 932–938 and 942–948, respectively. Each of these flip flops holds a single bit of data from the micropacket. In essence, the data is transferred into SSR 210 serially, but shifted into the even register 930 and odd register 940 in parallel.

Even register 930 and odd register 940 are loaded on the rising edge of C_H signal 850 when LD_EVEN_L 980 is asserted (low assertion state) or LD_ODD_L 985 is asserted, respectively. These signals are generated off handshake signal 490 which is low during the first four serial bit transmission and high during the following four serial bit transmission. The load signals are asserted before the rising edge of C_H signal 850 and de-asserted before the following edge of C_H signal 850. In particular, the first four bits that are received by SSR 210 are shifted into even register 930 and the second four bits received by SSR 210 are shifted into odd register 940.

D_AVAIL0_L is generated off handshake signal 490 and is an asynchronous signal that is received by processing core 240 from SSR 210. When received by processing core 240 it indicates that the first piece of data is valid in even register 930. The data in even register 930 is then loaded into processing core 940 followed by the odd register 940 being loaded into processing core 240 during the following cycle.

The "ping pong" registers 930 and 940 have a clear advantage over conventional solutions where all data bits would be synchronized to the domain of core clock 225 through a synchronizer circuit. The conventional solution has intermittent failures and high latency. Further, the output of the "ping pong" registers 930 and 940 are held valid twice as long than if the data was latched into a single register. The advantage of this can be demonstrated by the following explanation. The first half of a micro-packet are latched into even register 930 and held while SSR 210 receives the second half of the micro-packet. Then the second half of the micro-packet is latched into odd register 940 and held. The interval between the loading of even register 930 and odd register 940 is 10 ns. The earliest time point that even register 930 could be loaded again with half a micro-packet of data would be 10 ns after odd register 940 was loaded. This means that the data on the output of either even register 930 or odd register 940 is held constant for 20 ns. This, in conjunction with handshake signal 490, guarantees that data from even register 930 and odd register 940 can be latched into the core clock domain.

Figure 12A:
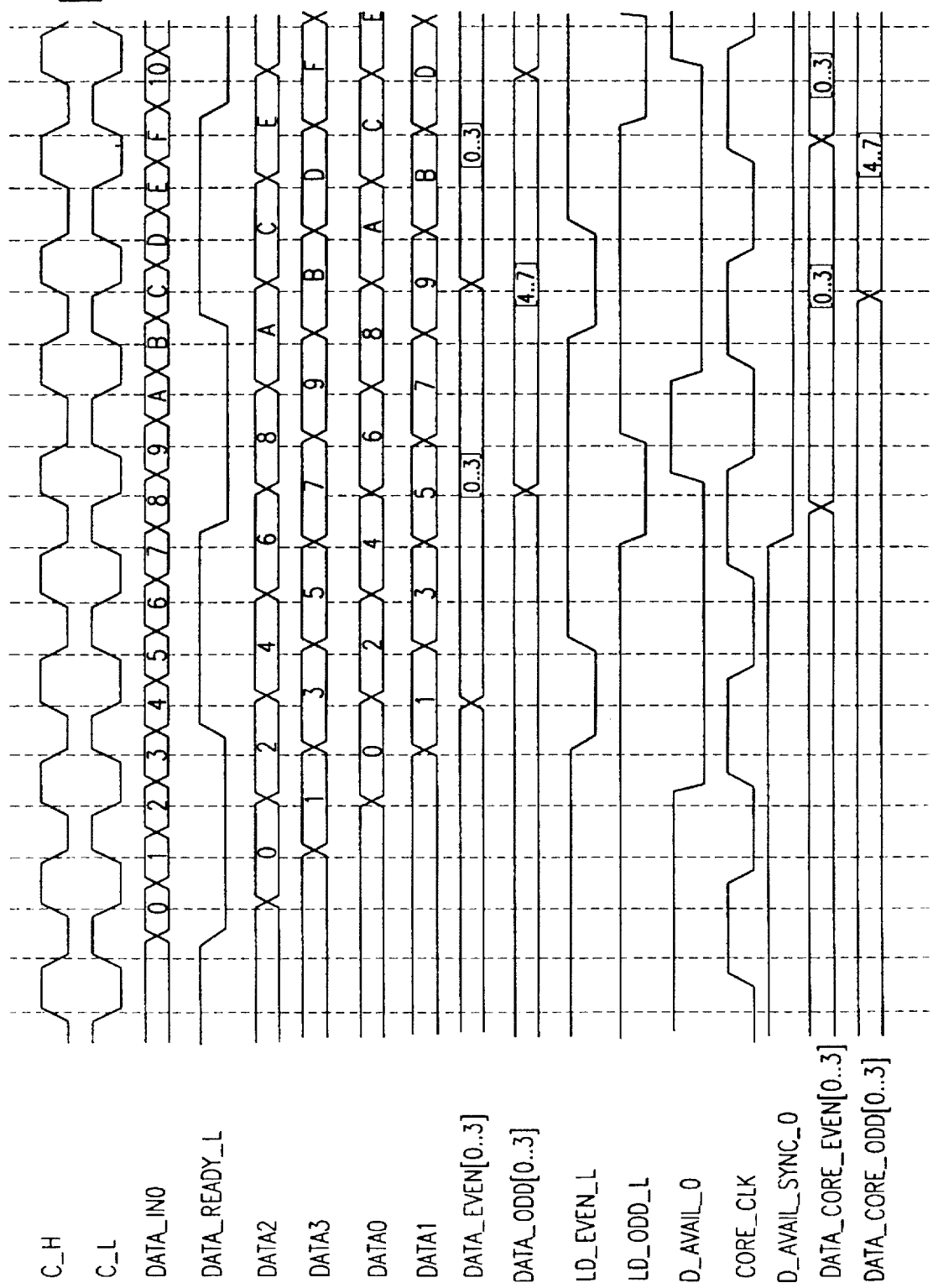
FIGS. 12A and 12B are timing diagrams that illustrate how data is transferred Am the SSR to the processing core.

FIG. 12A shows a timing diagram that illustrates how data is transferred from the even register 930 and odd register 940 into processing core 240. CORE_CLK is core clock 225. D_AVAIL0_L is synchronized by synchronizer 1075 to D_AVAIL_SYNC_0_L. It takes two rising edges of CORE_CLK 225 to be detected by processing core 240. Once it has been detected the data from even register 930 is transferred (as shown by DATA_CORE_EVEN). In the case of FIG. 12A, the relationship between core clock 225 and D_AVAIL0_L 1095 is optimal to allow the lowest possible latency. That is, D_AVAIL_L 1095 is very close to the rising edge of core clock 225.

Figure 12B:
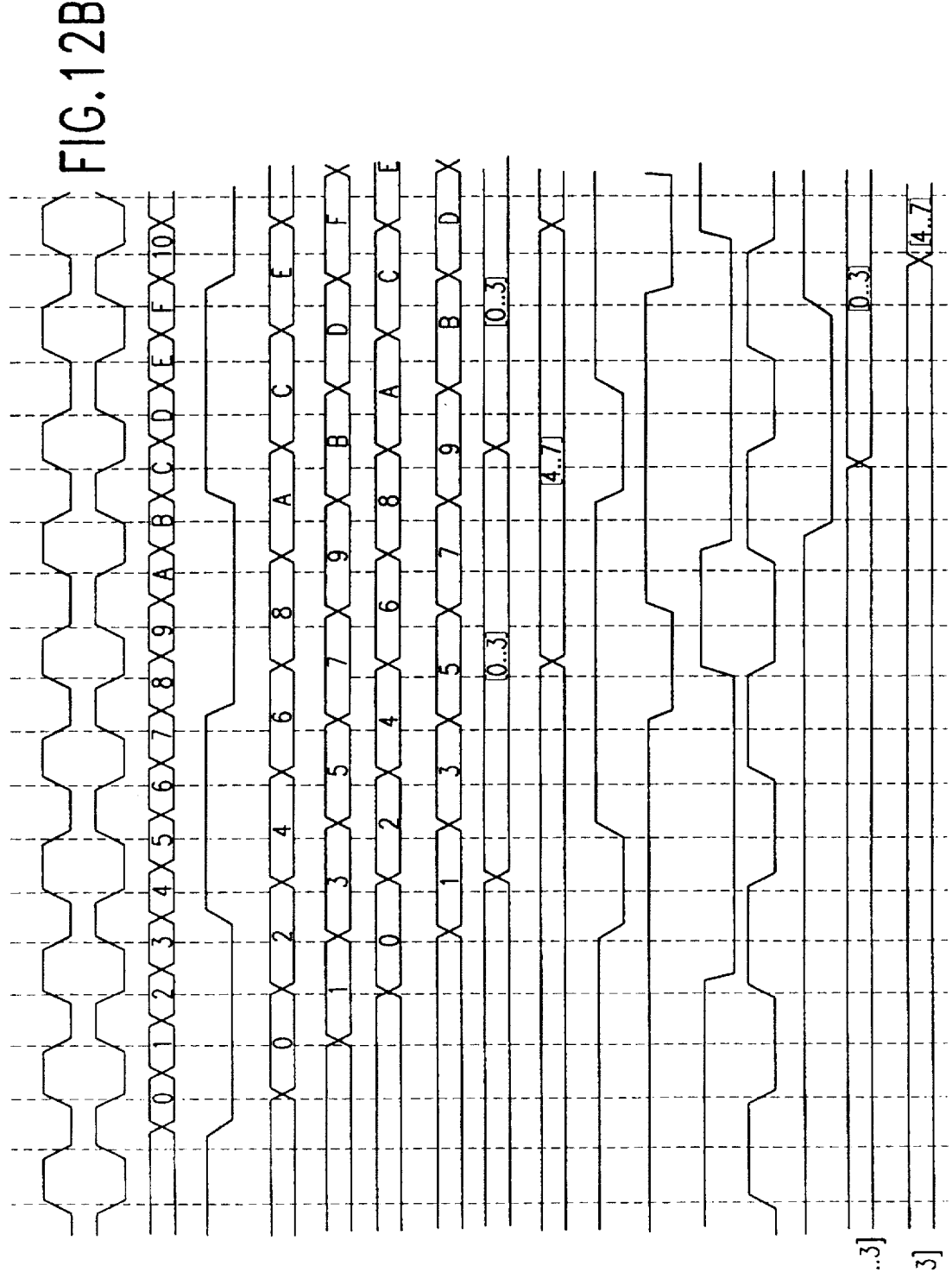

FIG. 12B is exactly the same as FIG. 12A, but in this case D_AVAIL0_L 1095 is too late to get the rising edge of core clock 225 and is thus missed. Consequently, the following rising edge is the first rising edge of core clock 225. FIG. 12B accounts for the maximum latency potential. FIGS. 12A and 12B illustrate that despite that fact that the sample point for data has slipped nearly a whole core clock cycle, the data is still valid on the outputs of even register 930 and odd register 940 and is accurately sampled. By delaying the DATA_AVAIL0_L 1095 going into synchronizer 1075, the minimum and maximum sample points for the output of SSR 210 can be adjusted. As long as the DATA_AVAIL0_L 1095 is not delayed by more than a local clock period then data will be valid coming out of even register 930 and odd register 940 relative to D_AVAIL_SYNC_0_L 1085.

FIG. 13 is a diagram illustrating the chip floor plan for SSR 210. The layout of SSR 210 should be done such that each SSR data slice (or cell) is layed out starting from the two outer most points of the chip. Two such SSR data slices are labeled as reference numbers 1305 and 1310. As discussed above, there are a total of twenty SSR data slices. In the center of the chip, an area 1120 is created to lay out the handshake (DATA_READY_L) signal (shown at reference number 1330) and the load, asynchronous and fanout cells (i.e., including the clock and control signals—LD_ODD_L 980 and LD_EVEN_L 985) (shown at reference number 1340). These signals are placed in the center of the chip in order to minimize the skew between each of these signals. The clocks and multiplexor select signals should run orthogonal to the data, sideband information, handshake signal, and clock signals to minimize the cross-talk due to capacitive coupling.

While the invention has been particularly shown and described with reference to preferred embodiments thereof, it will be understood by those skilled in the art that various changes in form and details may be made therein without departing from the spirit and scope of the invention.

What is claimed is:

1. A system for transferring data between two processing nodes across a communication channel, comprising:

a driver configured to receive data from one of the processing nodes and to transmit said data onto the communication channel, said driver further configured to transmit a pair of clocks and a handshake signal across the communication channel; and a receiver, connected to said driver via the communication channel, configured to receive said data, said pair of clocks and said handshake signal from the communication channel, said receiver having, a first set of registers for storing said data as it is received from the communication channel, wherein said first set of registers are clocked by said pair of clocks, and a second set of registers, connected to said first set of registers, for receiving and storing said data from said first set of registers, wherein said handshake signal is used to generate control signals that control said second set of registers.

2. The system of claim 1, wherein said driver is connected to a first processing node and said receiver is connected to a second processing node, said second processing node having a local clock, wherein said handshake signal is synchronized by said receiver with respect to said local clock in order to transfer said data stored in said second set of registers into said second processing node.

3. The system of claim 2, wherein said first processing node inserts an idle cycle into said data to prevent overrun by said receiver if and only if said data is continuously transmitted for a programmable number of clock cycles.

4. The system of claim 2, wherein said first processing node includes means for calculating a check code to provide protection for said data, and means for recovering from detected errors by retransmitting said data which encountered a faulty check code.

5. The system of claim 1, wherein said driver latches data in parallel into a set of input flip-flops using a first local clock and outputs said data onto the communication channel using a second local clock, wherein said first local clock is one fourth the frequency of said second local clock.

6. The system of claim 1, wherein said handshake signal is transmitted by said driver at a first frequency, wherein said pair of clocks arm transmitted by said driver at a second frequency, and wherein said first frequency is less than said second frequency.

7. The system of claim 1, wherein said data is transferred onto the communication channel along with side band information.

8. The system of claim 1, wherein said data stored in said second set of registers is valid for at least two clock cycles.

9. A system for transferring data between two processing nodes across a communication channel, comprising:

a driver configured to receive data in parallel from one of the processing nodes and to transmit said data onto the communication channel serially, said driver further configured to transmit a first clock and a handshake signal across the communication channel; and a receiver, connected to said driver via the communication channel, configured to serially receive said data, said first clock, and said handshake signal from the communication channel, said receiver having, a first set of registers for serially storing said data as it is received from the communication channel, wherein said first set of registers are clocked by said first clock, and a second set of registers, connected to said first set of registers, for receiving and storing said data from said first set of registers in parallel, wherein said handshake signal is used to generate control signals that control said second set of registers.

10. The system of claim 9, wherein said driver transmits a second clock onto the communication channel, said second clock is a true complement of said first clock.

11. The system of claim 9, wherein said driver latches data in parallel into a set of input flip-flops using a first local clock and outputs said data onto the communication channel using a second local clock, wherein said first local clock is one fourth the frequency of said second local clock.

12. The system of claim 9, wherein said driver is connected to a first processing node and said receiver is connected to a second processing node, said second processing node having a local clock, wherein said handshake signal is synchronized by said receiver with respect to said local clock in order to transfer said data stored in said second set of registers into said second processing node.

13. The system of claim 12, wherein said first processing node inserts an idle cycle into said data to prevent overrun by said receiver if and only if said data is continuously transmitted for a programmable number of clocks.

14. The system of claim 12, wherein said first processing node includes means for calculating a check code to provide protection for said data, and means for recovering from detected errors by retransmitting said data which encountered a faulty check code.

15. The system of claim 9, wherein said data is transferred onto the communication channel along with side band information.

16. The system of claim 9, wherein said data stored in said second set of registers is valid for at least two clock cycles.

17. A method of transferring data between a first processing core and a second processing core across a communication channel, wherein said first processing core and said second processing core each have a local clock, comprising the steps of:

(1) serially transferring a plurality of data bits onto the communication channel along with a pair of source synchronous clocks and a handshake signal;

(2) latching said plurality of data bits into a first set of flip-flops using said pair of source synchronous clocks;

(3) generating a set of control signals based on said handshake signal;

(4) latching, in parallel, said plurality of data bits stored in said first set of flip-flops into a second set of flip flops in response to said set of control signals;

(5) synchronizing said handshake signal to the local clock of the second processing core; and (6) transferring said plurality of data bits stored in said second set of flip-flops into the second processing core based on said synchronized handshake signal.

18. A system for transferring data between a first processing core and a second processing core across a communication channel, wherein said first processing core and said second processing core each have a local clock, said system comprising:

means for serially transferring a plurality of data bits onto the communication channel along with a pair of source synchronous clocks and a handshake signal;

means for latching said plurality of data bits into a first set of flip-flops using said pair of source synchronous clocks;

means for generating a set of control signals based on said handshake signal, means for latching, in parallel, said plurality of data bits stored in said first set of flip-flops into a second set of flip flops in response to said set of control signals;

means for synchronizing said handshake signal to the local clock of the second processing core; and means for transferring said plurality of data bits stored in said second set of flip-flops into the second processing core based on said synchronized handshake signal.

19. A system for transferring data between two processing nodes across a communication channel, comprising:

a driver configured to receive data from one of the processing nodes and to transmit said data onto the communication channel, said driver further configured to transmit a first clock and a handshake signal across the communication channel; and a receiver, connected to said driver via the communication channel, configured to receive said data, said first clock and said handshake signal from the communication channel, said receiver having, a first set of registers for storing said data as it is received from the communication channel, wherein said first set of registers are clocked by said first clock, and a second set of registers, connected to said first set of registers, for receiving and storing said data from said first set of registers, wherein said handshake signal is used to generate control signals that control said second set of registers.

20. The system of claim 19, wherein said driver transmits a second clock onto the communication channel, said second clock is a true complement of said first clock, wherein said receiver is configured to receive said second clock, and wherein said first set of registers are further clocked by said second clock.

21. The system of claim 19, wherein said driver is connected to a first processing node and said receiver is connected to a second processing node, said second processing node having a local clock, wherein said handshake signal is synchronized by said receiver with respect to said local clock in order to transfer said data stored in said second set of registers into said second processing node.

22. The system of claim 19, wherein said first processing node inserts an idle cycle into said data to prevent overrun by said receiver if and only if said data is continuously transmitted for a programmable number of clock cycles.

23. The system of claim 19, wherein said first processing node includes means for calculating a check code to provide protection for said data, and means for recovering from detected errors by retransmitting said data.

24. The system of claim 19, wherein said driver latches data in parallel into a set of input flip-flops using a first local clock and outputs said data onto the communication channel using a second local clock, wherein said first local clock is one fourth the frequency of said second local clock.

25. The system of claim 19, wherein said data is transferred onto the communication channel along with side band information.

26. The system of claim 19, wherein said data stored in said second set of registers is valid for at least two clock cycles.

* * * * *